(12) United States Patent
Akopian et al.

(10) Patent No.: US 6,909,738 B2
(45) Date of Patent: Jun. 21, 2005

(54) METHOD IN A RECEIVER AND A RECEIVER

(75) Inventors: David Akopian, Tampere (FI); Ilkka Kontola, Julkujärvi (FI); Harri Valio, Lempäälä (FI); Seppo Turunen, Tampere (FI)

(73) Assignee: Nokia Mobile phones Ltd., Espoo (FI)

( * ) Notice: Subject to any disclaimer, the term of this patent is extended or adjusted under 35 U.S.C. 154(b) by 790 days.

(21) Appl. No.: 09/826,260

(22) Filed: Apr. 4, 2001

(65) Prior Publication Data

US 2001/0033606 A1 Oct. 25, 2001

(30) Foreign Application Priority Data

Apr. 6, 2000 (FI) ............................................. 20000819

(51) Int. Cl.$^7$ .............................................. H04L 27/30
(52) U.S. Cl. ...................... 375/142; 375/150; 375/343; 375/367; 370/515; 370/516
(58) Field of Search ................................. 375/142, 145, 375/149, 150, 343, 366, 367; 370/510, 512, 514–516

(56) References Cited

U.S. PATENT DOCUMENTS

| | | | | |
|---|---|---|---|---|
| 5,192,957 A | | 3/1993 | Kennedy | 342/357 |
| 6,028,883 A | | 2/2000 | Tiemann et al. | 375/200 |
| 6,151,353 A | * | 11/2000 | Harrison et al. | 375/136 |
| 6,289,041 B1 | * | 9/2001 | Krasner | 375/152 |

FOREIGN PATENT DOCUMENTS

| | | |
|---|---|---|
| EP | 0635728 | 1/1995 |
| EP | 0 892 528 A2 | 1/1999 |
| EP | 1 107 018 A2 | 6/2001 |
| EP | 1 152 546 A2 | 11/2001 |

OTHER PUBLICATIONS

"An FPGA Receiver for CPSK Spread Spectrum Signaling", Chan et al., Department of Electrical and Computer Engineering, The University of British Columbia, vol. 45, No. 1, Feb. 1999, pp. 181–191.

* cited by examiner

*Primary Examiner*—Dac V. Ha
(74) *Attorney, Agent, or Firm*—Perman & Green, LLP

(57) ABSTRACT

The invention relates to a method for acquiring a receiver (1) into a code modulated spread spectrum signal received by the receiver (1). In the method at least one replica code (r) is used which corresponds to a code used with the modulation having a pre-determined number of chips, and an examination phase is performed, in which a frequency shift of the signal within a selected frequency area is examined, and a code phase of the code used with the modulation is examined. In the method the frequency shift examination is divided into a first estimation phase and a second estimation phase, wherein in the first estimation phase the selected frequency area is divided into a first set of frequencies, and in the second estimation phase a second set of frequencies is examined nearby each frequency of the first set of frequencies. Further, a comparison for frequencies of the second set of frequencies is performed using the received signal and the replica code (r), and the results of the comparison are used to estimate the correct frequency shift.

29 Claims, 15 Drawing Sheets

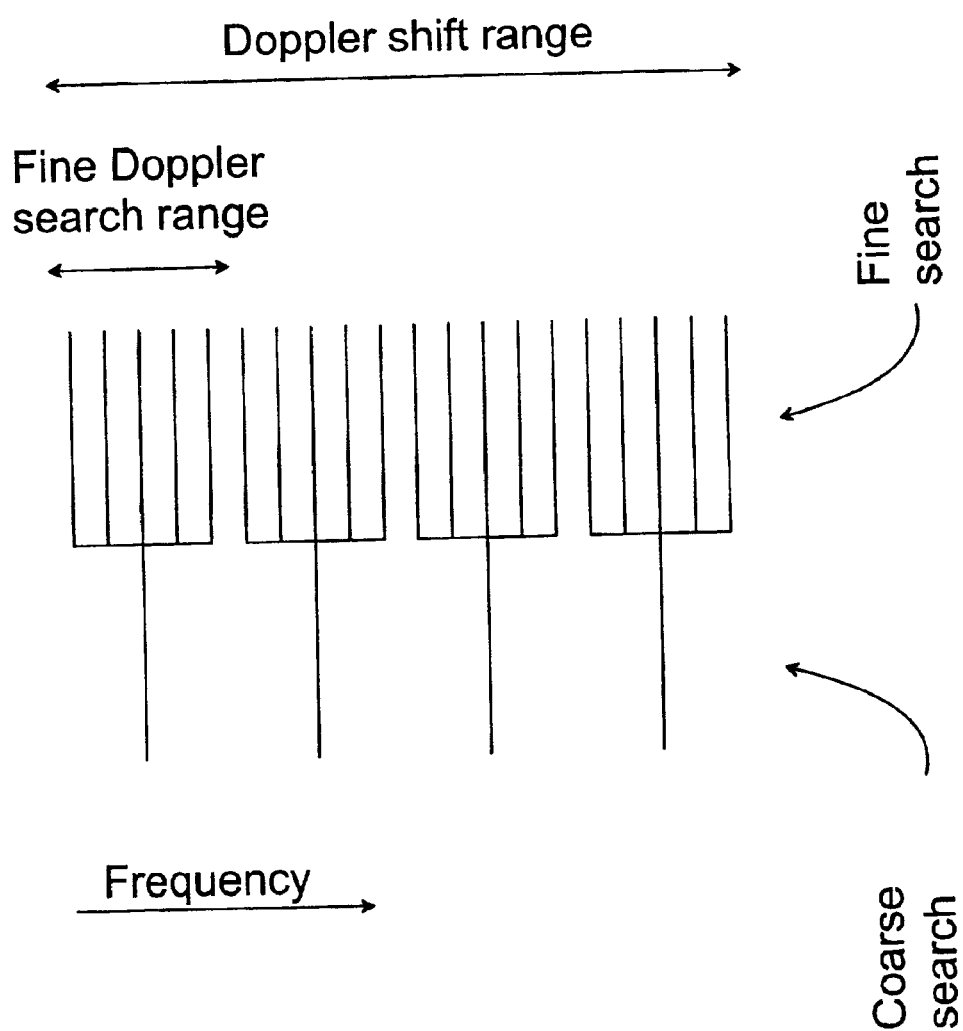

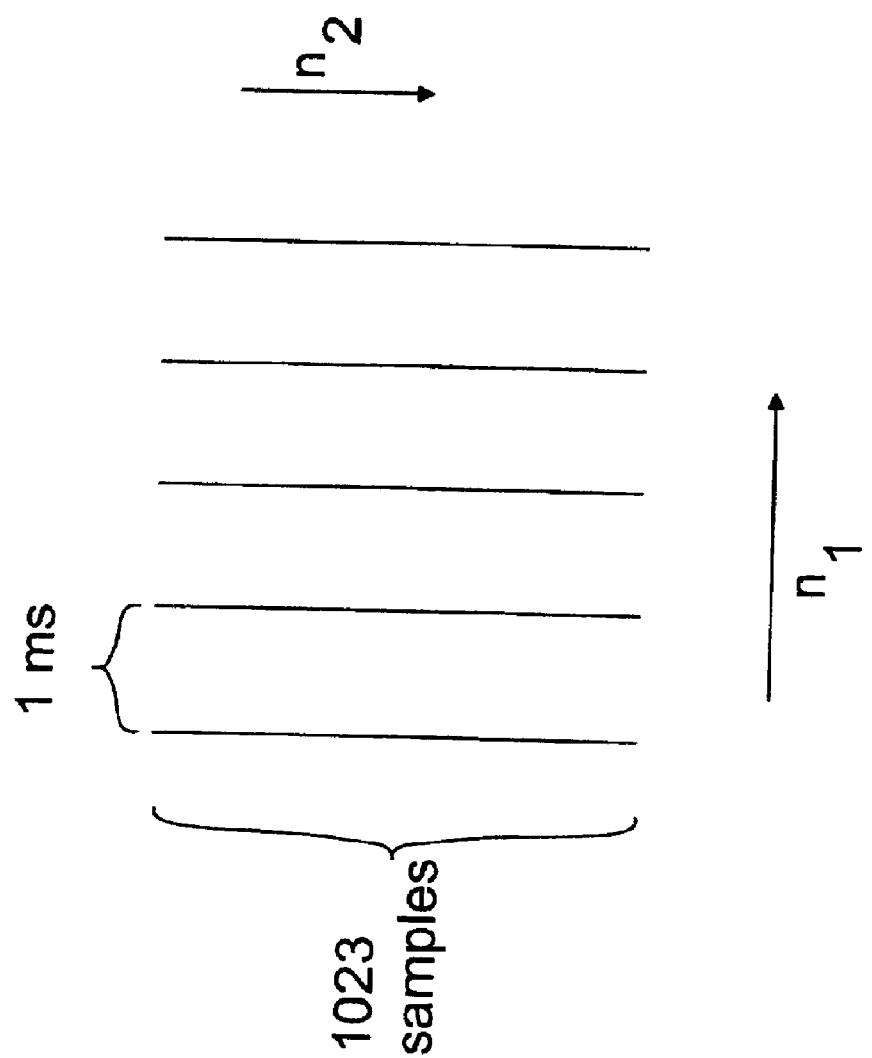

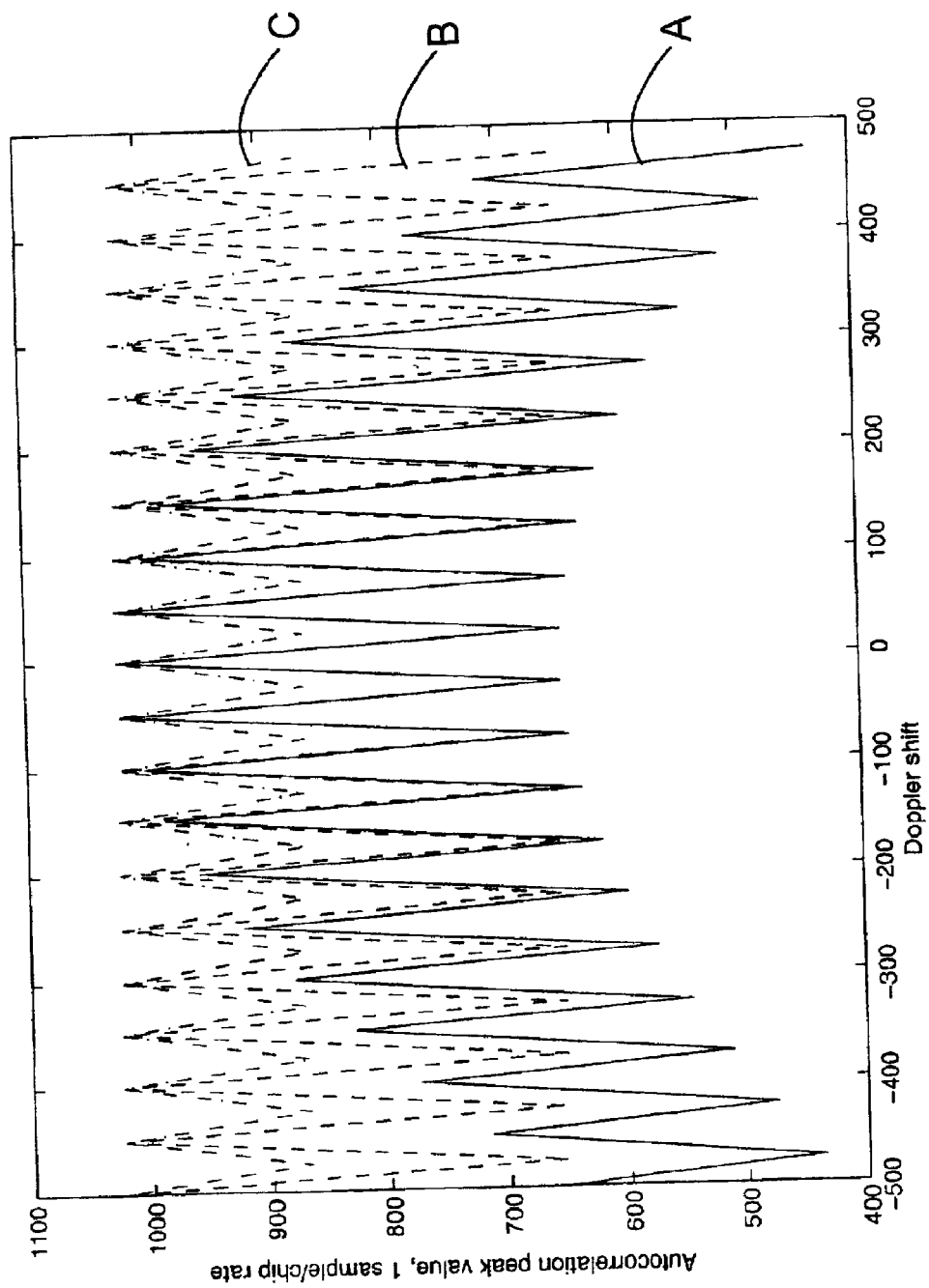

Figure 1A:
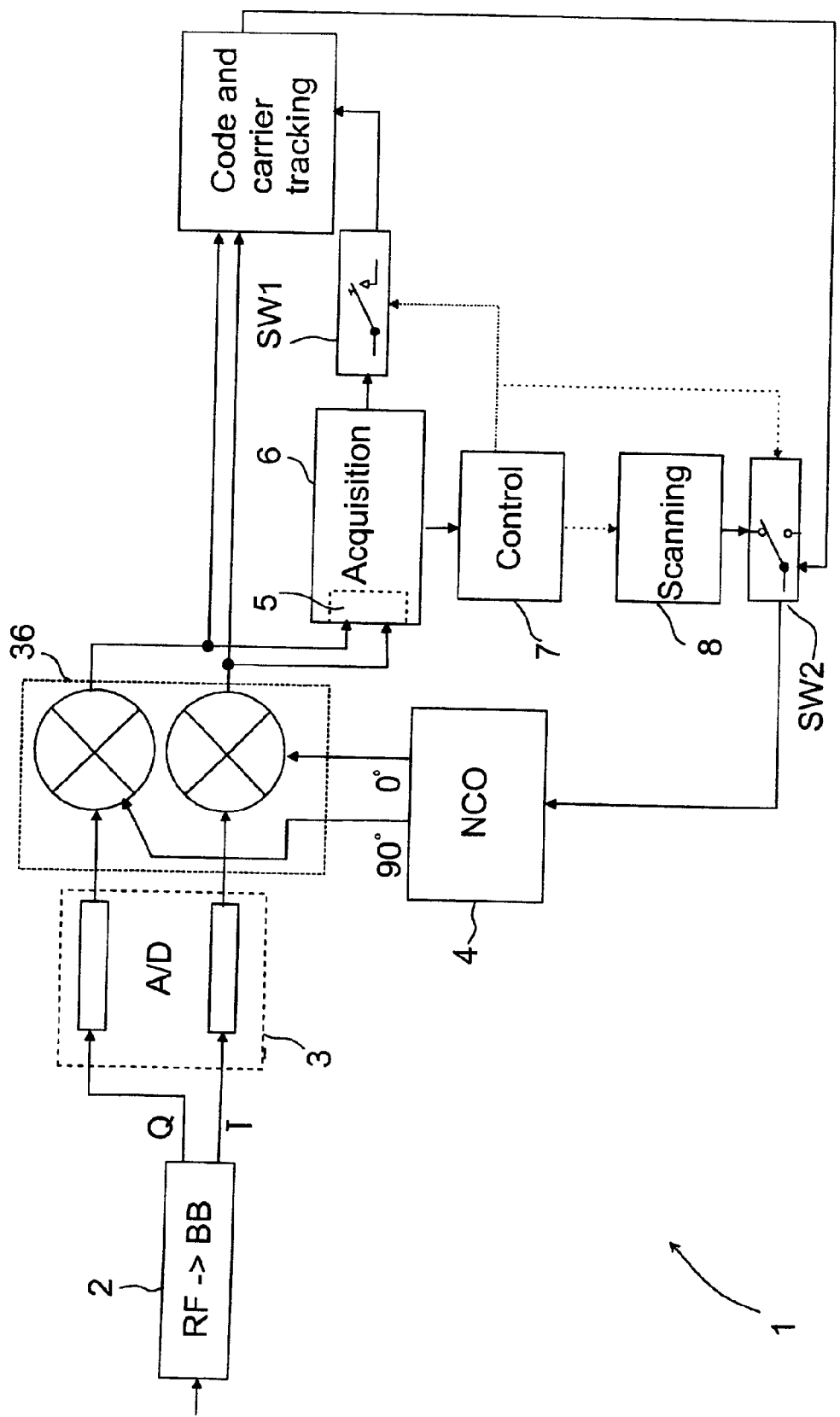

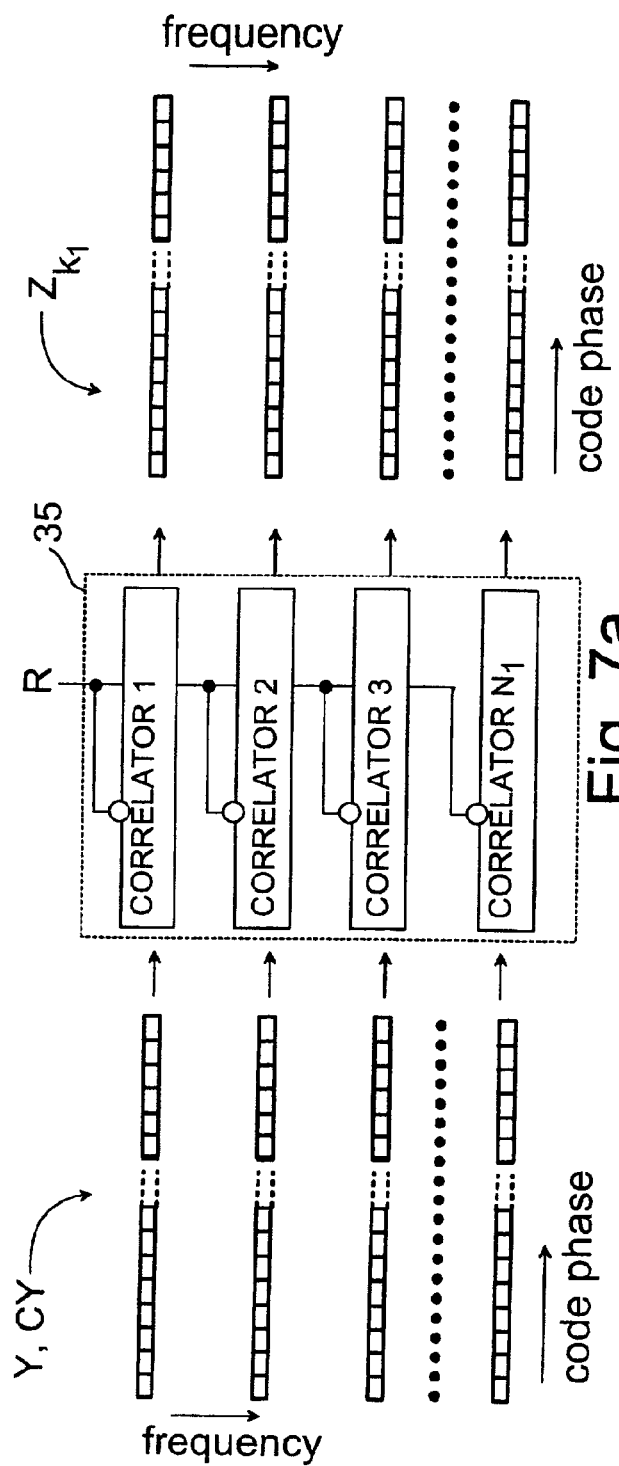
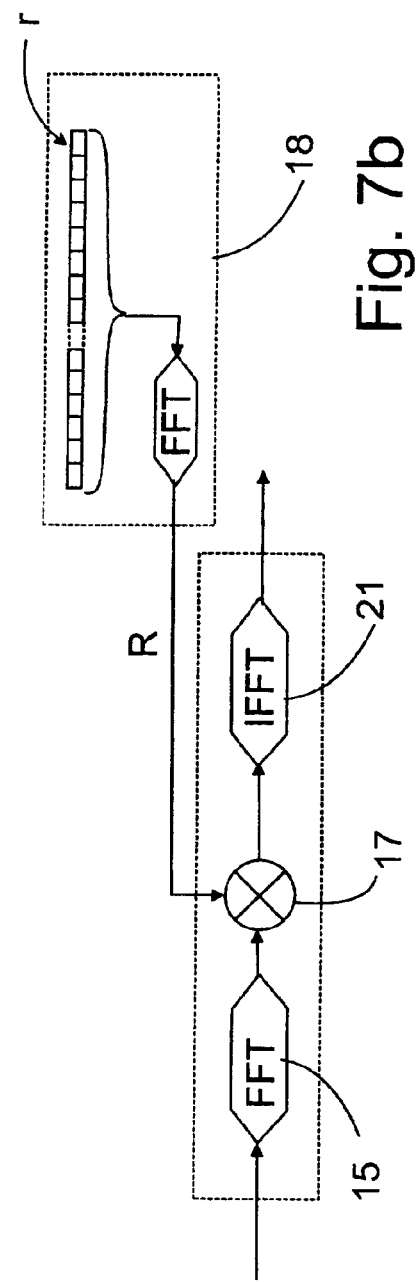
Fig. 7a
Fig. 7b

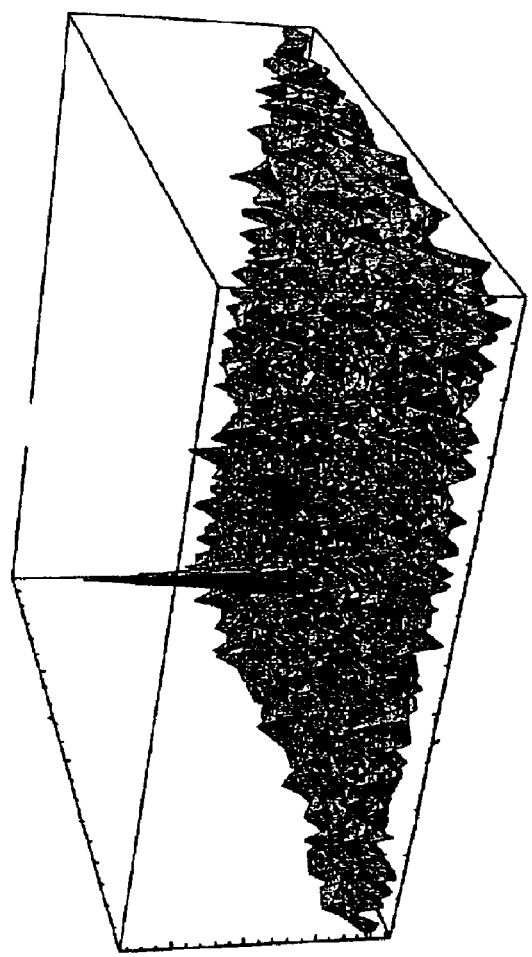
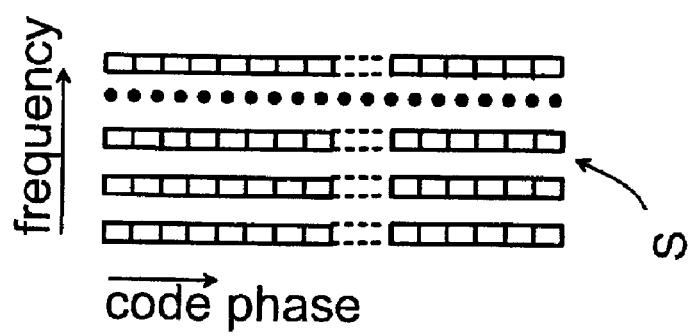
Fig. 9

METHOD IN A RECEIVER AND A RECEIVER

The present invention relates to a method for performing acquisition in a receiver as set forth in the preamble of the appended claim 1. The present invention relates further to a location system as set forth in the preamble of the appended claim 8. The present invention relates further to a receiver as set forth in the preamble of the appended claim 15. The present invention relates also to an electronic device as set forth in the preamble of the appended claim 22.

One known positioning system is the GPS system (Global Positioning System) which comprises more than 30 satellites, of which at least 4, in some situations even 12, are simultaneously within the sight of a receiver. These satellites transmit information about satellites, e.g. Ephemeris data of the satellite as well as data on the time of the satellite. The receiver used for positioning infers its position normally in such a way that the receiver calculates the time of propagation of a signal transmitted simultaneously from several satellites in the positioning system to the receiver. For the positioning, the receiver must typically receive the signal of at least four satellites within its sight, in order to calculate the position.

Each satellite of the GPS system transmits a so-called L1 signal at a carrier frequency of 1575.42 MHz. This frequency is also indicated with $154f_0$, where $f_0=10.23$ MHz. Furthermore, the satellites transmit an L2 signal at a carrier frequency of 1227.6 MHz, i.e. $120f_0$. In the satellite, the modulation of these signals is performed with at least one pseudo sequence. This pseudo sequence is different for each satellite. As a result of the modulation, a code-modulated wideband signal is generated. The modulation technique used makes it possible in the receiver to separate the signals transmitted from different satellites, although the carrier frequencies used in the transmission are substantially the same. This modulation technique is called code division multiple access (CDMA). In each satellite, for modulating the L1 signal, the pseudo sequence used is e.g. a so-called C/A code (Coarse/Acquisition code), which is the Gold code. Each GPS satellite transmits a signal by using an individual C/A code. The codes are formed as a modulo-2 sum of two 1023-bit binary sequences. The first binary sequence G1 is formed with a polynome $X^{10}+X^3+1$, and the second binary sequence G2 is formed by delaying the polynome $X^{10}+X^9+X^8+X^6+X^3+X^2+1$ in such a way that the delay is different for each satellite. This arrangement makes it possible that different C/A codes can be produced with an identical code generator. The C/A codes are thus binary codes whose chipping rate in the GPS system is 1.023 MHz. The C/A code comprises 1023 chips, wherein the iteration time of the code is 1 ms. This repeating sequence can also be called as an epoch. The carrier of the L1 signal is further modulated with navigation information at a bit rate of 50 bit/s. The navigation information comprises information about the health of the satellite, its orbit, time data, etc.

During their operation, the satellites monitor the condition of their equipment. The satellites may use for example so-called watch-dog operations to detect and report possible faults in the equipment. The errors and malfunctions can be instantaneous or longer lasting. On the basis of the health data, some of the faults can possibly be compensated for, or the information transmitted by the malfunctioning satellite can be totally disregarded. Furthermore, in a situation in which the signal of more than four satellites can be received, different satellites can be weighted differently on the basis of the health data. Thus, it is possible to minimize the effect of errors possibly caused by satellites which seem unreliable in the measurements.

To detect the signals of the satellites and to identify the satellites, the receiver must perform synchronization, whereby the receiver searches for the signal of each satellite at the time (acquisition) and attempts to be synchronized and locked to this signal (tracking) so that the data transmitted with the signal can be received and demodulated.

The positioning receiver must perform the synchronization e.g. when the receiver is turned on and also in a situation in which the receiver has not been capable of receiving the signal of any satellite for a long time. Such a situation can easily occur e.g. in portable devices, because the device is moving and the antenna of the device is not always in an optimal position in relation to the satellites, which impairs the strength of the signal coming to the receiver. Also, in urban areas, buildings affect the signal to be received, and furthermore, so-called multipath propagation can occur, wherein the transmitted signal comes to the receiver along different paths, e.g. directly from the satellite (line-of-sight) and also reflected from buildings. This multipath propagation causes that the same signal is received as several signals with different phases.

Both the movement of the receiver and the movement of the satellites in general will continuously change the strength, phase, number, etc. of the signals entering the receiver. The movement of the satellites and inaccurate local time reference of the receiver also cause a shift of the carrier frequency, also called as a Doppler shift. Thus, changes are also caused in the signal received by the receiver. For this reason, the receiver must try, after the synchronization, to continuously maintain locking to the signal of each satellite from which information is received e.g. for positioning. In the receiver, the code phase is calculated very frequently, and the oscillator is adjusted, if necessary, in such a way that the receiver remains synchronized.

The positioning arrangement has two primary functions:
1. to calculate the pseudo distance between the receiver and the different GPS satellites, and
2. to determine the position of the receiver by utilizing the calculated pseudo distances and the position data of the satellites. The position data of the satellites at each time can be calculated on the basis of the Ephemeris and time correction data received from the satellites.

The distances to the satellites are called pseudo distances, because the time is not accurately known in the receiver. Thus, determinations of the position and the time are repeated, until a sufficient accuracy has been reached with respect to the time and the position. Because time is not known with absolute precision, the position and the time must be found out e.g. by linearizing the set of equations for each new iteration. The pseudo distance can be calculated by measuring the mutual, virtual propagation delays of the signals of the different satellites.

Almost all known GPS receivers utilize correlation methods for calculating the distances. In a positioning receiver, pseudo random sequences of different satellites are stored or generated locally. A received signal is subjected to conversion to an intermediate frequency (down conversion) and then to the baseband, after which the receiver multiplies the received signal with the stored pseudo random sequence. The signal obtained as a result of the multiplication is integrated or low-pass filtered, wherein the result is data about whether the received signal contained a signal transmitted by a satellite. The multiplication is iterated in the receiver so that each time, the phase of the pseudo random sequence stored in the receiver is shifted. Consequently, this means cross-correlation between the received signal and the pseudo random sequence generated/stored in the receiver. The correct code phase is inferred from the correlation result preferably so that when the correlation result is the greatest, the correct code phase has been found. Thus, the receiver is correctly synchronized with the received signal.

This code synchronization process should be performed at different possible Doppler frequencies, otherwise even for correct code phase the correlation could be small if the received signal is modulated due to Doppler shift in frequency.

After the synchronization with the code, the next step is the phase locking. The correlation result also indicates the information transmitted in the GPS signal; that is, it is a demodulated signal.

The above-mentioned synchronization and frequency tuning process must be iterated for each signal of a satellite which is received in the receiver. Consequently, this process takes a lot of time particularly in a situation in which the signals to be received are weak. To speed up this process, some receivers of prior art use several correlators, wherein it is possible to search for correlation peaks simultaneously. However, in practical applications it is not feasible to speed up the acquisition process by increasing the number of correlators because the number of correlators can not be increased unlimitedly due to e.g. the power consumption, the size and the cost of the receiver.

In some prior art receivers FFT technique have been used in connection with the correlators to define the Doppler shift of the received GPS-signal. In these receivers a correlation is used to decrease the bandwidth of the received signal. Then this narrow-band signal is analyzed with FFT algorithms to estimate the Doppler shift in carrier frequency.

It is an aim of the present invention to provide a receiver in which an attempt is made to estimate the Doppler frequency and code phase shifts for acquisition to the received signal. The invention is suitable for use particularly in positioning receivers, but also in other receivers, preferably CDMA receivers, where the receiver must be synchronized and locked with a spread spectrum signal. The invention is based on the idea that the search in Doppler frequency dimension is performed for a group of nearby frequencies at once along with the search in code phase dimension. Thus the search in Doppler frequency is performed essentially in two phases, wherein in one phase a coarse Doppler frequency is assumed and then a fine grid of Doppler frequencies is analyzed around that coarse frequency. At the same time the search in code phase direction could be performed by many known techniques implementing circular correlation. The preferred approach described in this invention assumes the correlation is performed in frequency domain using DFT (FFT). In the present invention the Doppler frequency search is actually performed by compensating the possible frequency shift, then correlating with local replica code for different code phases and comparing the largest of correlation results by magnitude with a decision threshold. When it exceeds the preset threshold then the guessed Doppler frequency is taken as the estimate. Coherent and non-coherent processings are also incorporated in above-mentioned scheme to enhance the performance. The Doppler compensation prior to the correlation results in undegraded correlation values when comparing with the techniques in which search for the Doppler frequency is performed after the correlation. The method according to the present invention is characterized in what will be presented in the characterizing part of the appended claim 1. The location system according to the present invention is characterized in what will be presented in the characterizing part of the appended claim 8. The receiver according to the present invention is characterized in what will be presented in the characterizing part of the appended claim 15. The electronic device according to the present invention is characterized in what will be presented in the characterizing part of the appended claim 22.

The present invention gives considerable advantages with respect to methods and receivers of prior art. The method of the invention can be used to improve and speed up the acquisition to the received signals also on weak signal conditions. By the method according to the invention, the acquisition calculation can be performed by using less calculations than methods of prior art. The receiver according to the invention can be implemented with a relatively small number of components and the total energy consumption can be kept reasonable in comparison with a receiver of prior art to achieve the same resolution, wherein the invention is particularly well applicable in portable devices. Thus, the positioning receiver can also be implemented in connection with a wireless communication device.

Figure 1B:
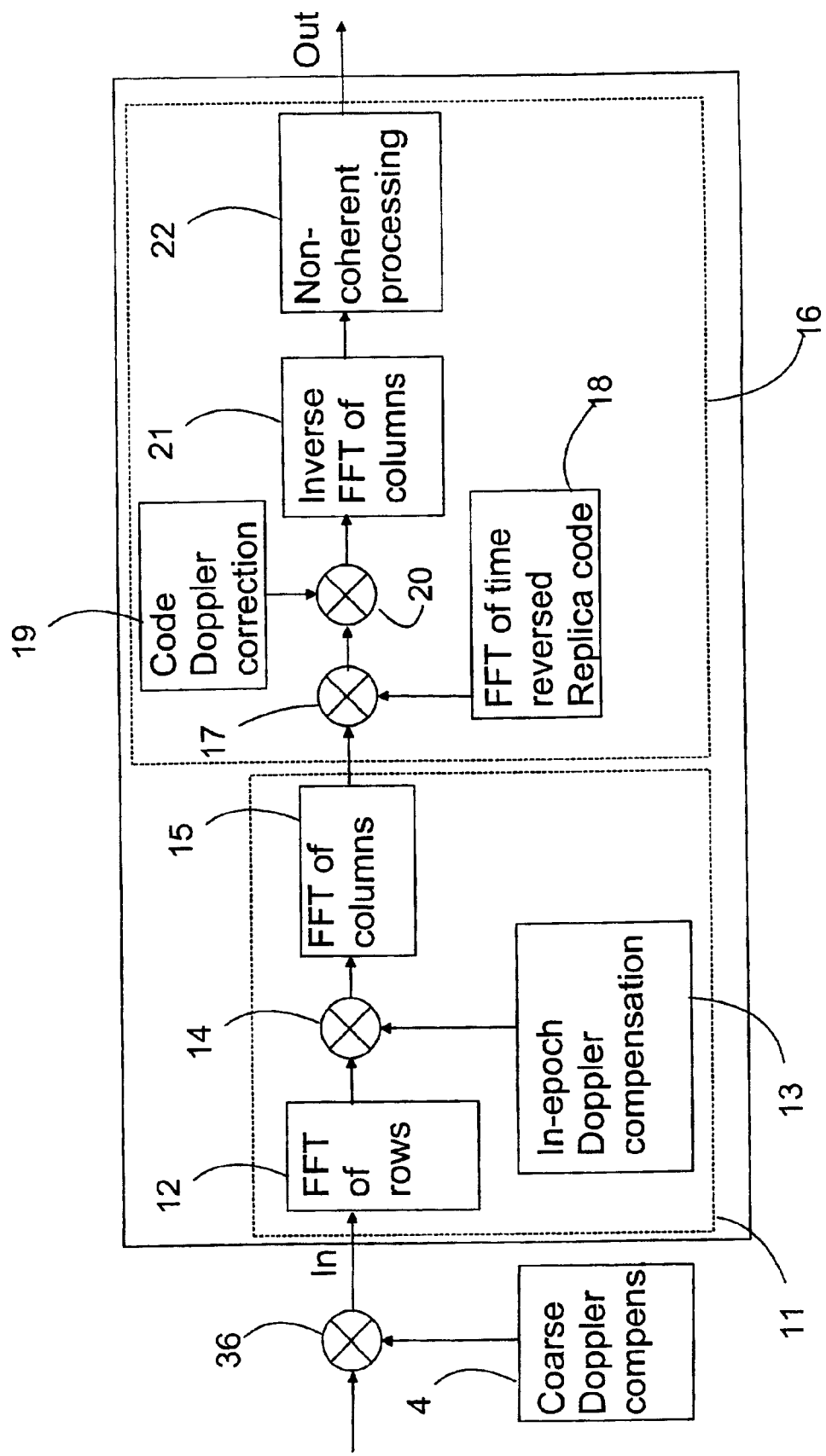
Figure 1C:
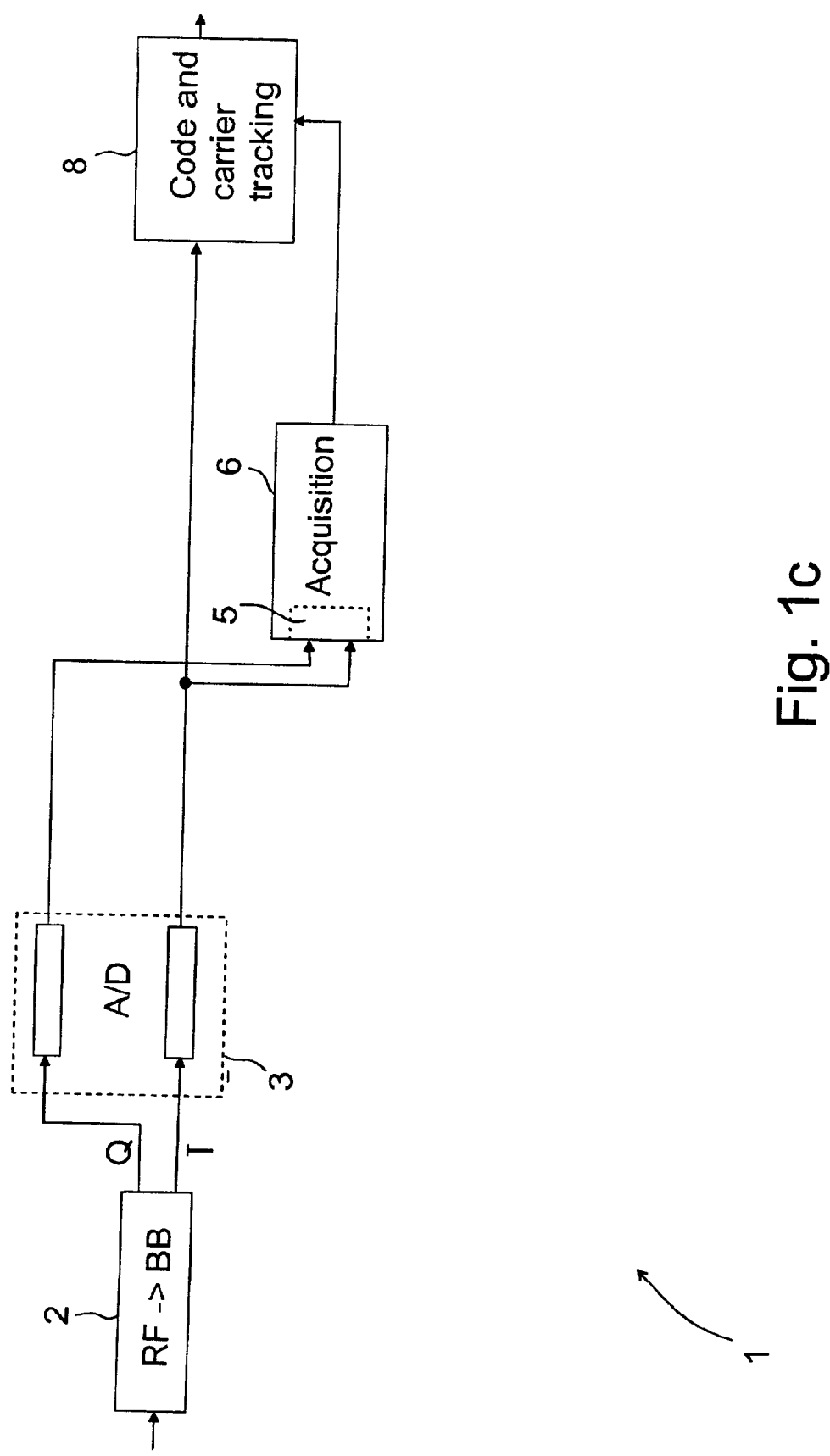
Figure 1D:
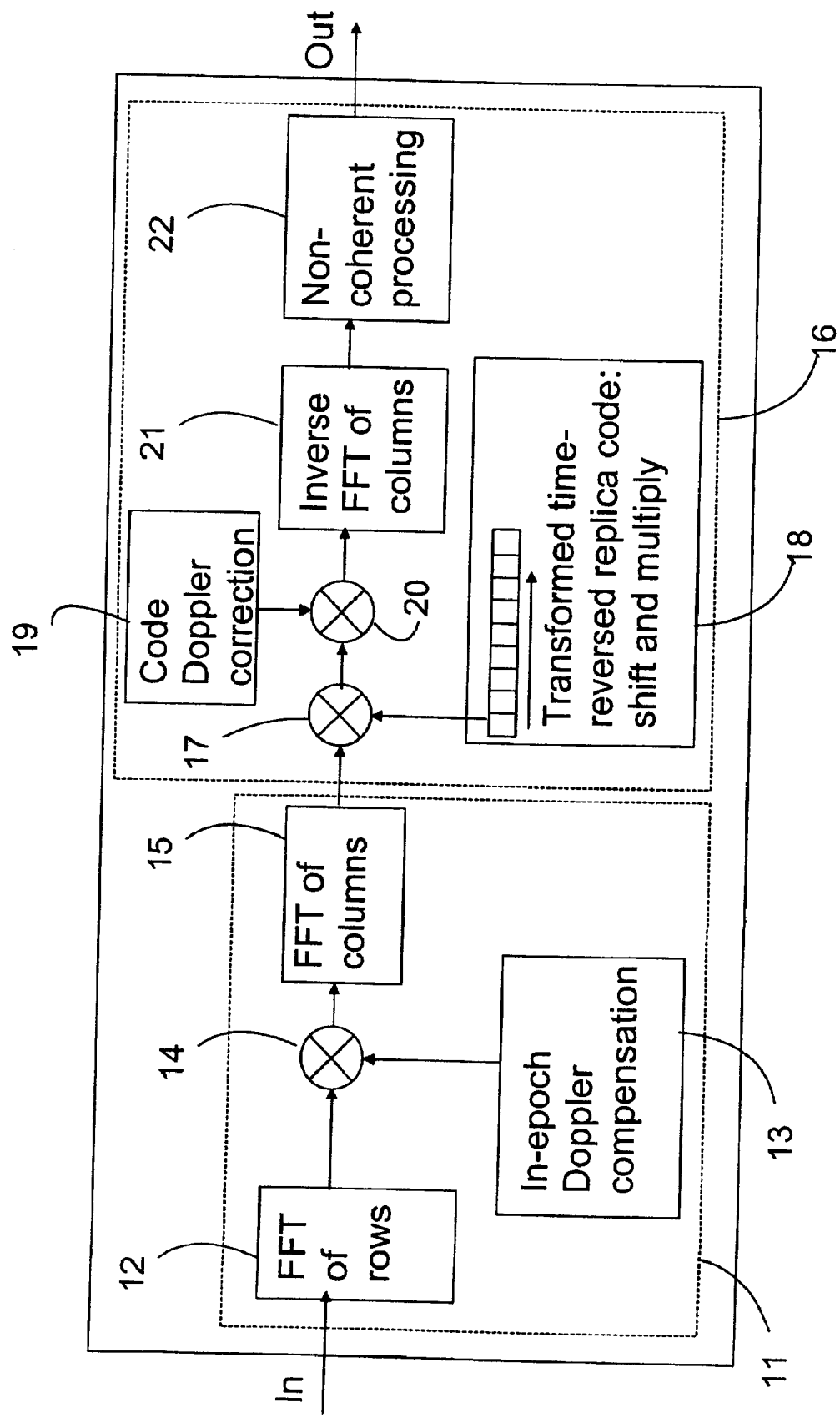
Figure 2B:
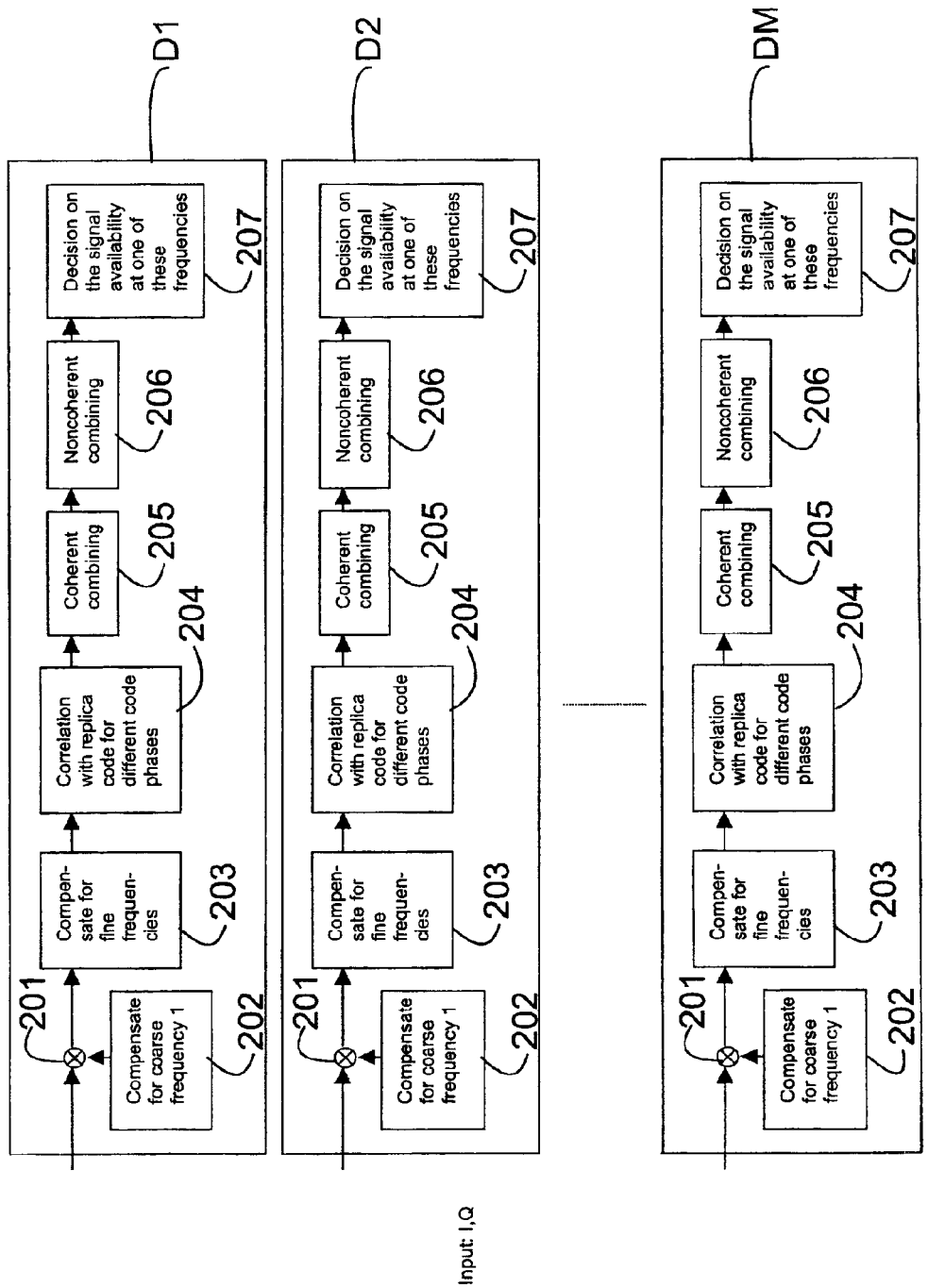
Figure 5:
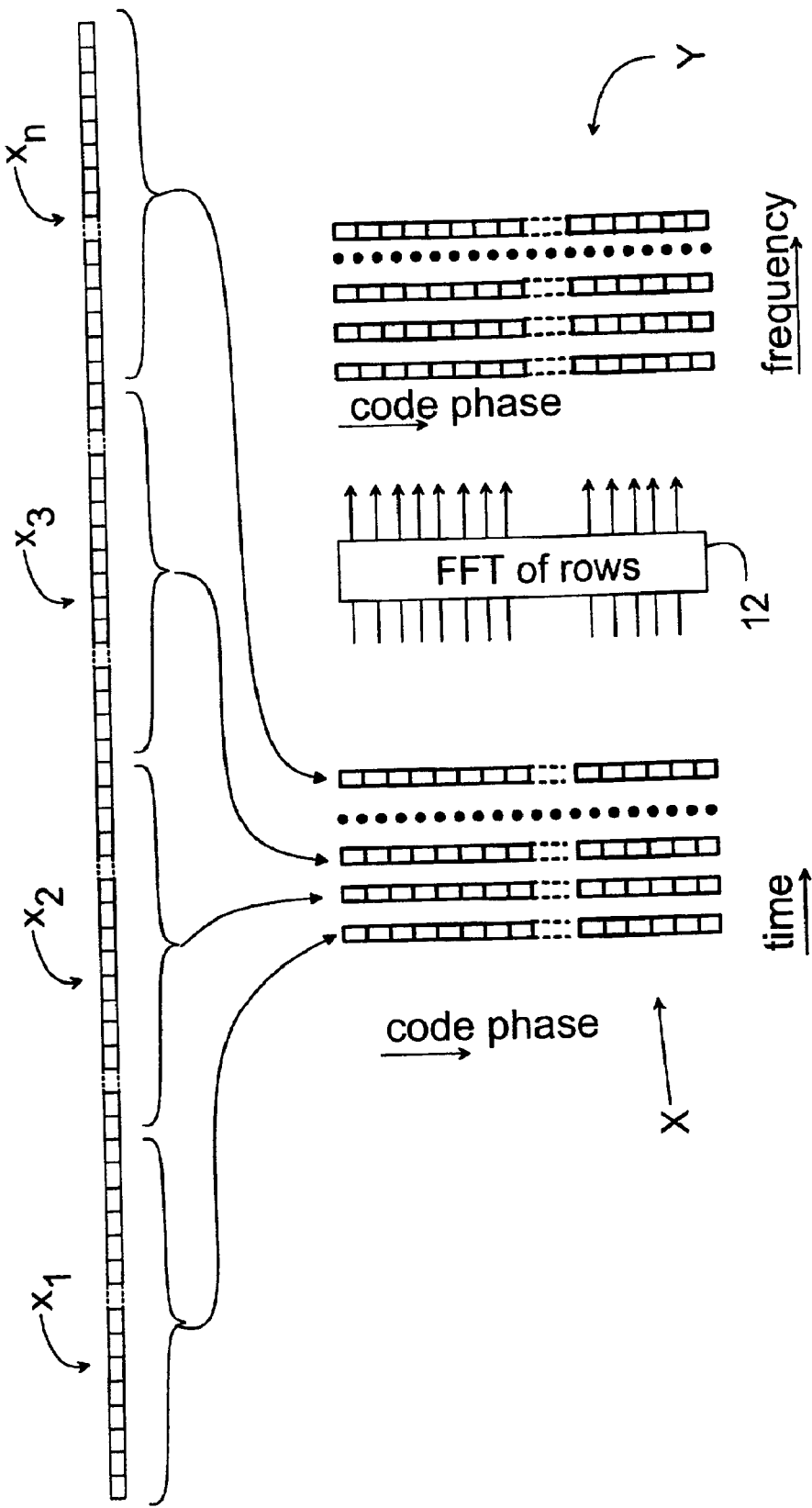
Figure 6:
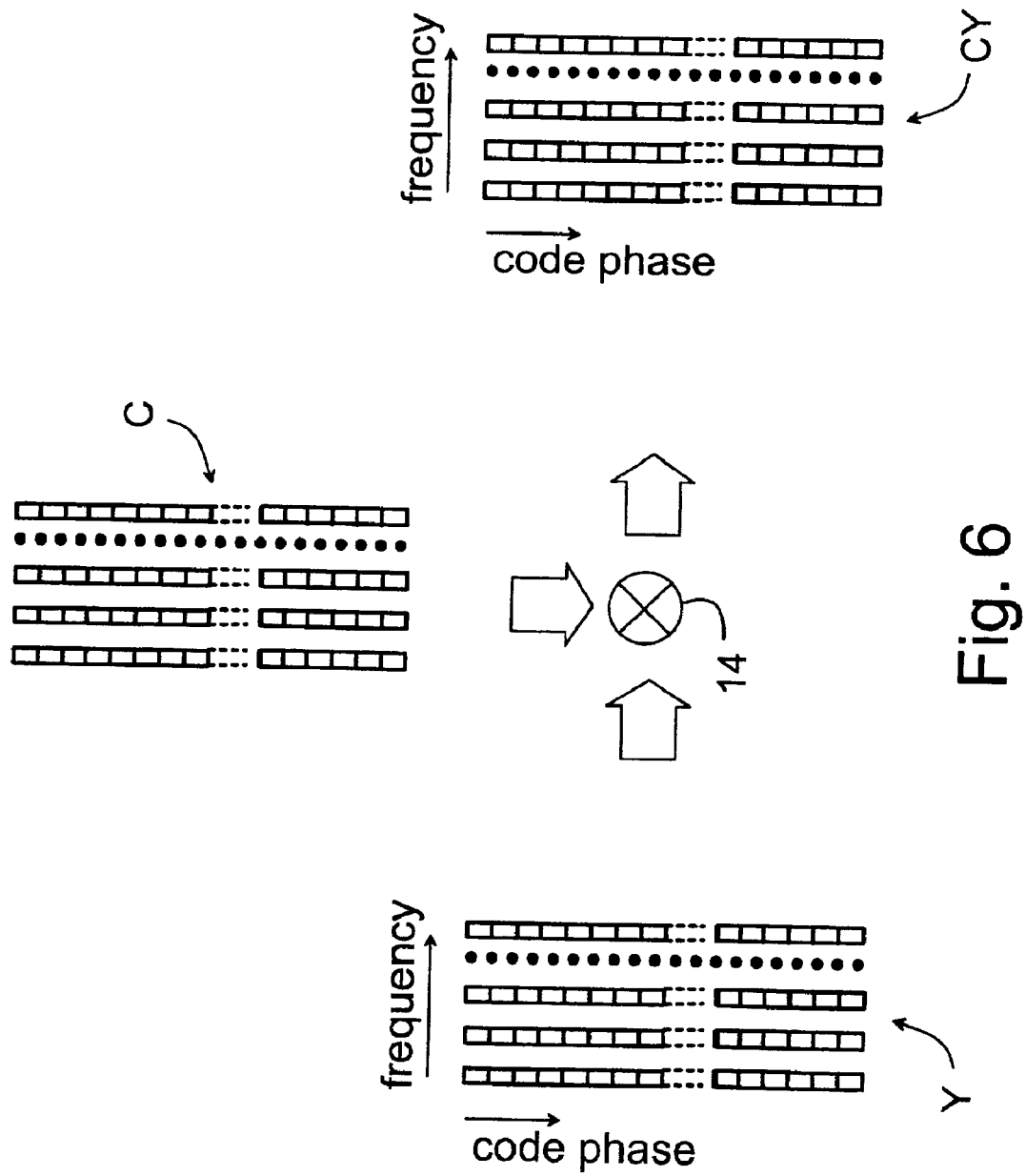
Figure 8:
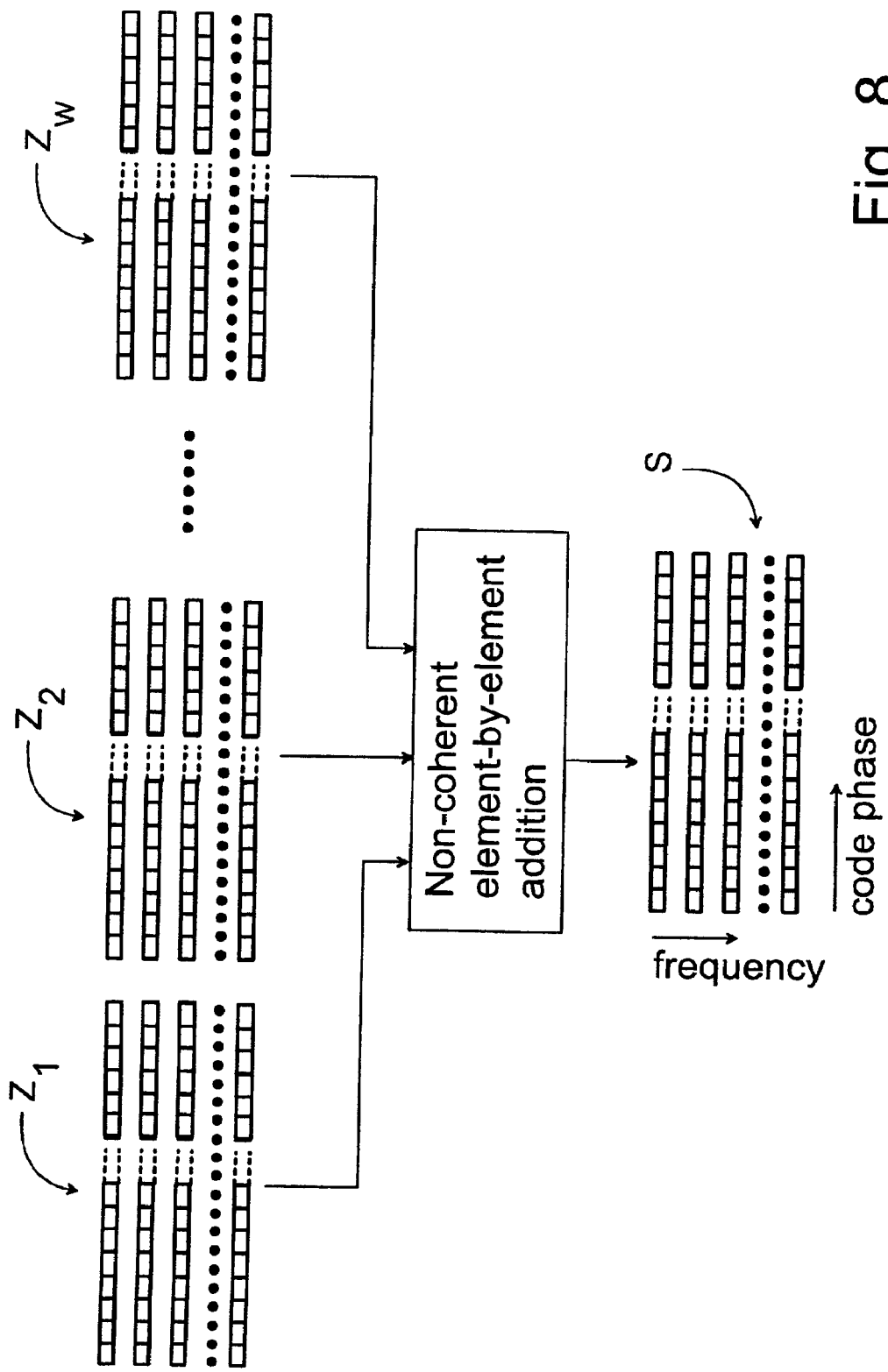
Figure 10:
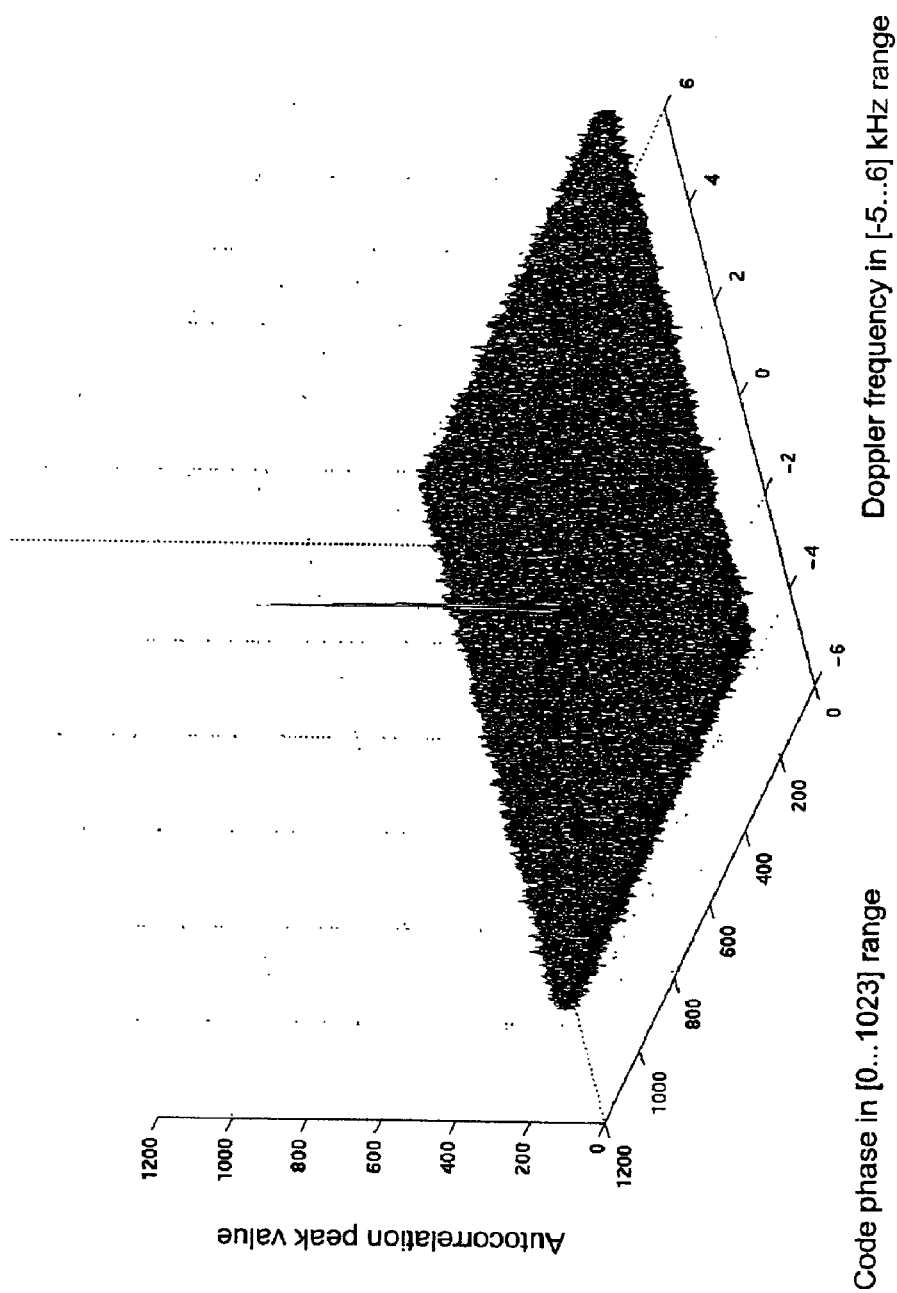
Figure 11:
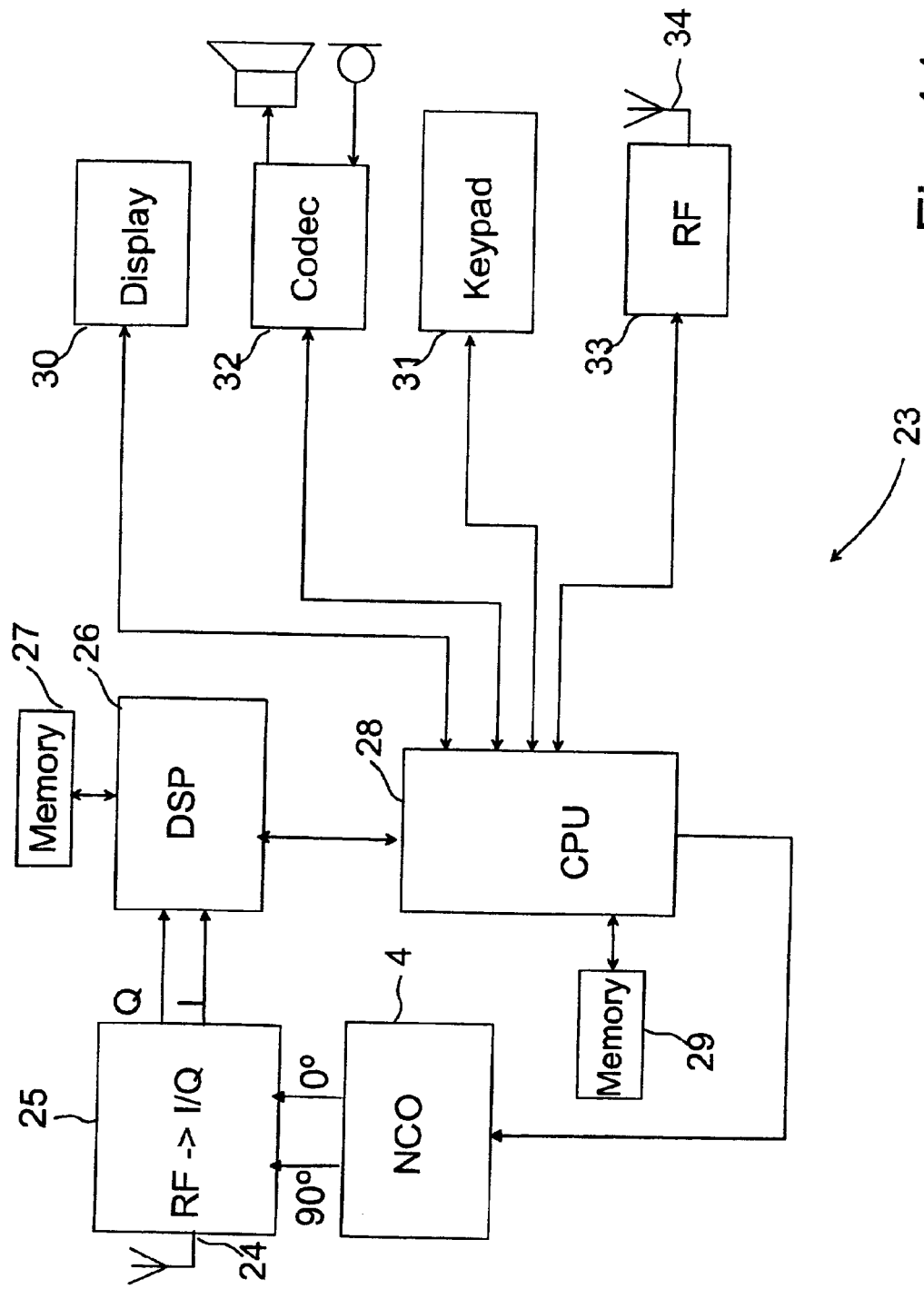

In the following, the present invention will be described in more detail with reference to the appended drawings, in which FIG. 1a illustrates, in a reduced block chart, a signal monitoring block of a positioning receiver, in which the method according to an advantageous embodiment of the invention can be applied, FIG. 1b illustrates, in a reduced block chart, an acquisition block of a positioning receiver, according to an advantageous embodiment of the invention, FIG. 1c illustrates, in a reduced block chart, the signal monitoring block of a positioning receiver, in which the method according to another advantageous embodiment of the invention can be applied, FIG. 1d illustrates, in a reduced block chart, an acquisition block of a positioning receiver, according to another advantageous embodiment of the invention, FIGS. 2a and 2b illustrate the coarse and fine Doppler methods according to the invention, FIG. 3 illustrates the composition of received data with columns as repetitive epochs arranged in a row, FIG. 4 illustrates the correlation peak degradation as a function of the Doppler shift, FIG. 5 illustrates coherent addition in fine Doppler compensation phase according to an advantageous method of the invention with multiple assumptions on possible fine Doppler shift, FIG. 6 illustrates in-epoch compensation in fine Doppler compensation phase according to an advantageous method of the invention, FIG. 7 illustrates matched filtering in the fine Doppler compensation phase according to an advantageous method of the invention, FIG. 8 illustrates an advantageous embodiment of the non-coherent summing method which can be used in connection with the invention, FIG. 9 illustrates a two-dimensional search matrix formed by the non-coherent summing method which can be used in connection with the invention, FIG. 10 illustrates a two-dimensional search matrix formed by the shifting of the FFT transformed pseudo random sequence of the corresponding satellite according to another advantageous embodiment of the invention, and FIG. 11 illustrates an electronic device according to a preferred embodiment of the invention in a reduced block chart.

The acquisition method according to an advantageous embodiment of the present invention will be described in more detail. The purpose of the acquisition is to adjust the phases of the incoming signal and the locally generated pseudo random sequence of the corresponding satellite to a small timing offset and also find Doppler frequency modulation.

When the receiver is turned on and also in a situation in which the receiver has not been capable of receiving the signal of any satellite for a long time a two-dimensional search phase is performed in the receiver for each satellite whose signal is to be received. In this two-dimensional search phase the aim is to find out the shift in carrier frequency and the code phase of the satellites. The carrier frequency is affected by the Doppler shift and inaccuracies of the local oscillator of the receiver. The uncertainty of the carrier frequency may be as large as ±6 kHz, wherein the receiver has to perform the search within 12 kHz frequency range around the transmission frequency (L1=1575.42 MHz). Also, the receiver does not know the exact code phase wherein the receiver has to find out the correct code phase. The code period of a GPS signal consists of 1023 chips and when signal is sampled at a rate of $k_s$ samples per chip then there are $k_s*1023$ possible code phases for search. The number $k_s$ is not necessarily an integer, e.g., 1023 chips after sampling could be represented by 1024 or 2048 samples. Then the two-dimensional search process is needed, in which one dimension is the Doppler (frequency) shift within 12 kHz frequency range and the other dimension is the code phase from $k_s*1023$ possible code phases. In the method according to the invention this two-dimensional search process is performed by using two phases: the coarse Doppler compensation phase and the fine Doppler compensation phase. The coarse compensation phase utilises the whole frequency range, e.g. 12 kHz frequency range preferably in 1 kHz (or less) steps, and the fine Doppler compensation phase utilises the frequency range of each step of the coarse Doppler compensation, e.g. 1 kHz frequency range. It is obvious that the values used in this disclosure are presented as non-limiting examples only. The present invention can also be applied with other than GPS systems, wherein the mentioned frequency values, code phases and number of codes may vary.

In the following an advantageous method of the invention will be described in more detail in connection with the receiver of FIG. 1a and the acquisition block of FIG. 1b. To perform the coarse Doppler compensation phase along with the fine Doppler compensation phase the received signal is first sampled to convert the signal into discrete, coherent values, i.e. complex numbers comprising digitized values of the Q-component and the I-component of the received signal. As was mentioned above the coarse Doppler search is performed in broader steps, e.g. in 1 kHz steps and the fine Doppler search is performed in narrower steps within each coarse Doppler search, e.g. in 0.2 kHz steps.

FIG. 1a presents schematically the acquisition process. The processing in acquisition block 6 could be performed at intermediate frequency with appropriate implementation of numerically controlled oscillator, but in the following description it is assumed that the processing is performed at baseband.

The frequency of the numerically controlled oscillator 4 is set such that the receiver receives the demanded frequencies of the frequency range to be examined. In this example the examined bandwidth is 12 kHz. Then the received signal is transformed in a RF-block 2 into the intermediate frequency range or into baseband and sampled in an A/D-converter block 3. The sampling rate of the A/D-converter block 3 is such that at least one coherent sample of every chip is taken. GPS C/A signal is periodic with the period of 1 ms. In GPS system the chip rate is 1,023 chips (1 epoch) in 1 ms wherein the sampling rate in acquisition stage is preferably 1024 samples in 1 ms, or an integer multiple of it. Then a total of 1024 samples (or integer multiple of 1024 samples) are taken and stored into memory 5. For presentation purposes we will next assume that the number of samples is 1024. These samples form a sample vector $x_n$. The 1024 samples of the sample vector represent a signal having ca. 1 ms length. The sampling of the signal continues wherein the next 1024 samples are stored as the next sample vector $x_n$. These sample vectors are continuous in time such that the following sample vector continues after the previous sample vector, i.e. the time difference between the last sample of the previous sample vector and the first sample of the next sample vector is substantially the same as the time difference between samples in the sample vectors.

A number of sample vectors are stored for fine Doppler search. Depending on the granularity of the fine Doppler search and number of coherent additions the number of sample vectors may vary. For example, five consecutive sample vectors are used with the fine Doppler search, which is illustrated as a matrix X in FIG. 3. The number of columns, i.e. the number of sample vectors $x_n$ in the matrix X is labelled as $N_1$ and the number of rows, i.e. the number of samples $\hat{x}_n$ in each vector is labelled as $N_2$ wherein the total number of elements in the matrix X is $N=N_1N_2$. Although there are 1024 samples indicated in FIG. 3 it is obvious that the number of samples can also be other than that. In one alternative sampling method 1023 samples (or multiple of 1023) are taken and then one (or multiple) extra values, preferably zeros, are added to the sample vectors to achieve a vector length which is a power of two. This makes the FFT algorithms easier compared with the situation where the length of the sample vectors is other than a power of two.

A first time-to-frequency transform is performed after the sampling phase in the method according to the invention. The first time-to-frequency transform is performed to the samples of the sample vectors such that in each transform one sample of each sample vector is used. For example, the first samples of each sample vector are used in one transform, the second samples of each sample vector are used in another transform, etc. Therefore 1024 time-to-frequency transforms are performed for each fine Doppler search in this advantageous embodiment of the invention. The results of these time-to-frequency transforms are saved as a first transform matrix Y. This time-to-frequency transform is preferably a fast Fourier transform (FFT) and it is illustrated as a first FFT block 12 in FIG. 1b.

Hereinbelow, the Fourier transform will be primarily used as an example of a time-to-frequency transform and an inverse Fourier transform as an example of an inverse transform, i.e. a frequency-to-time transform; however, it is obvious that the present invention is not limited solely to these examples.

An advantageous embodiment of the invention comprises also an in-epoch compensation phase 13 which is performed after the first time-to-frequency transform phase to eliminate possible degradation of correlation peak values due to the Doppler shift. This degradation is illustrated in FIG. 4. A curve A illustrates the non-compensated correlation result in frequency domain. A curve B illustrates the compensated correlation result and a curve C illustrates the normalized compensated correlation result when a windowing is used with FFT, respectively. From FIG. 4 it can clearly be seen how the in-epoch compensation increases the accuracy of the correlation phase. This is achieved by multiplying 14 the values of the matrix Y with respective values of a compensation matrix C (FIG. 6). The result of the point-by-point multiplication is illustrated as a compensated matrix CY in FIG. 6.

The result of the previous stage is the fine Doppler compensated and coherently enhanced signal, meaning that each column of the matrix Y or CY is the Doppler compensated and coherently combined epochs of original signal assuming a particular fine Doppler frequency.

Next, the correlation phase is to be performed for each column of matrix Y or CY in which the correlation between the received signal of a satellite and the locally generated pseudo random code r of the satellite is calculated. The correlation phase is illustrated as a simplified diagram in FIG. 7a. The correlation result gives information of the code phase of the received signal. The correlation could be performed using methods of prior art but in the preferred embodiment of the invention it is performed in frequency domain.

The correlation in time domain corresponds to a multiplication in frequency domain. Therefore, the matrix Y, or the compensated matrix CY, is transformed 16 to frequency domain. The transform is performed in orthogonal direction with respect to the first time-to-frequency transform which in this advantageous embodiment of the invention means that the transform is performed by columns (epoch-by-epoch).

The pseudo random codes r of each satellite of the positioning system are preferably stored in the receiver, or the codes are generated in the receiver when needed. In the correlation phase the receiver selects, i.e. retrieves from the memory or generates the pseudo random code r which corresponds to the modulating code of the signal of the satellite into which the receiver is trying to perform the acquisition. This pseudo random code is called a replica code later in this description as a distinction to the actual pseudo random code used in the transmitting satellite. Then a time reversal is performed to the period of the replica code r. In this description the time reversal means such a modification that the first chip of the replica code becomes the last chip, the second chip becomes the second last chip, etc. The time reversed replica code is then transformed preferably to frequency domain by using e.g. fast Fourier transform. It is obvious that in some applications the time reversed version of the replica code can be stored into memory instead of the actual replica code r, or the receiver can directly generate the time reversed version of the replica code, wherein the time reversal of the replica code is not necessary during the operation of the receiver. It is also possible that if the time domain version of the reversed replica code is not needed, the transform domain version R of the reversed replica code can be stored in the receiver instead of the reversed replica code and the time-to-frequency transform of the reversed replica code is not needed during the acquisition phase.

The matrix Y, or the compensated matrix CY, is directed as a first input into a correlator block 35 and the frequency domain version R of the reversed replica code is directed as a second input into the multiplier block 17. Then these two frequency domain inputs are multiplied and the result of the multiplication is transformed by columns into time domain in the frequency-to-time transform block 21. It should be noted here that the matrices Y, CY, $Z_i$ are shown transposed in FIG. 7a, 8 for visualization purposes. The time domain output of the correlator block is then saved as a first correlation matrix $Z_1$ (FIG. 8) for further inspection. Each column of the first correlation matrix $Z_1$ comprises the crosscorrelation of the replica code r with all possible circular shifts of the same row of matrix Y, or CY. When the next correlation matrix $Z_2$ is formed in the similar way, it is added non-coherently to the first one and the process continues for several consecutive matrices.

FIG. 8 illustrates the non-coherent addition of the correlation matrices $Z_1$–$Z_W$ to form a search matrix S. It is evident, that the addition could be performed on-line without accumulating all the matrices. The non-coherent addition can be performed e.g. such that the absolute values of the elements of each correlation matrix Z are calculated and added up. The code phase and Doppler shift can now be searched by analyzing the search matrix S. In the analysis the values of the elements of the search matrix S are evaluated and advantageously a maximum value is searched. Then the maximum value is found and if it exceeds the decision threshold the matrix indexes (row, column) of the maximum value define the correct code phase and Doppler shift which then can be used during the tracking and position calculation phases known as such. This non-coherent processing is illustrated as a block 22 in FIG. 1b. If the maximum value does not exceed the decision threshold then it is decided that a signal is not present at this set of frequencies and the acquisition process continues with next coarse search stage. It is obvious that the above described method for detecting a signal of a satellite is used as an example here but other types of detectors could be used for signal detection as well.

The above described two-phase analyzing procedure is also illustrated in FIG. 2 where the lines on the left illustrate the frequency range division for the coarse Doppler search and the lines on the right illustrate the frequency range division for the fine Doppler search.

The mathematical details of the invention are considered in the following. The sequence of received GPS data is denoted as $\hat{x}_n$ in a situation that the Doppler shift is not affecting to the signal. The number of samples in epoch is denoted as $N_2$ and the number of periods during coherent processing is denoted as $N_1$. Also some data addressing variables are defined: $n_1$, which indicates the epoch and $n_2$, which indicate the position within the epoch. These variables are also illustrated in FIG. 3. The Doppler shift introduced by the satellite motion and local clock inaccuracies is defined as $k/(N_1N_2)$, i.e. taking the discrete grid of frequencies. Due to this Doppler shift the input signal is effected by a modulation and an additive noise $x_{noise}$ in a form $$x_n = \hat{x}_n e^{j\left(\frac{2\pi}{N_1 N_2} kn + \phi\right)} + x_{noise}. \tag{1}$$

Next, the multiplier $e^{j\phi}$ is neglected as it is a common scaling factor which it is not relevant for the further analysis and it cancels out during the non-coherent processing. In general, GPS receiver multiplies the incoming signal with a local replica code and integrates over several periods of the GPS signal with overall number of samples involved $N_1N_2$.

The coherent addition of epochs as the method to increase the signal-to-noise ratio will cause correlation peaks to be degraded if not compensated appropriately before the correlation as was mentioned earlier in the description. The compensation can be performed by multiplying the incoming sequence by $$e^{-j\frac{2\pi}{N_1N_2}kn} \quad (2)$$

if the Doppler shift is already known. However, in practical situations the Doppler shift is normally not known a priori. One advantageous solution is to perform the compensation with different values of k wherein the correct frequency value will exhibit itself as an undegraded peak after the correlation. This is illustrated in FIG. 2b, in which the method is illustrated as a simplified diagram. The input signal is examined in coarse frequency steps. The blocks D1, D2, ..., DM illustrate those coarse frequency steps. The coarse compensation is performed for each selected frequency step by mixing 201 the input signal with the signal of the numerically controlled oscillator 4. The frequency of the numerically controlled oscillator 4 is tuned 202 e.g. in 1 kHz steps for each examining phase. Then, the compensation for fine frequencies is performed 203 prior the correlation with replica code for different code phases 204. Then the correlation results are combined coherently 205 and non-coherently 206 to produce a search matrix S. The search matrix X is examined 207 e.g. by comparing it with a preset threshold value. If the decision signal has at least one value which is greater than the threshold value, it can be assumed that there exists a signal of a satellite at the examined frequency range. Also other prior art detection methods can be used to decide if there exists a signal of a satellite at the examined frequency range.

The variables k and n can be divided into two components such that $k=k_1+k_2N_1$, and $n=n_1N_2+n_2$, where $k_1,n_1=0, 1, \ldots, N_1-1$, and $k_2,n_2=0, 1, \ldots, N_2-1$. Now, a variable z is defined such that the components $r_{n_2}$ of replica vector r are involved:

$$z = \sum_{n_2=0}^{N_2-1} r_{n_2} \sum_{n_1=0}^{N_1-1} x_{n_1N_2+n_2} e^{-j\left(\frac{2\pi}{N_1N_2}kn\right)} \quad (3)$$

If Doppler frequency guess is correct then $$z = \sum_{n_2=0}^{N_2-1} r_{n_2} \sum_{n_1=0}^{N_1-1} x_{n_1N_2+n_2} e^{-j\left(\frac{2\pi}{N_1N_2}kn\right)}$$

$$= \sum_{n_2=0}^{N_2-1} r_{n_2} \sum_{n_1=0}^{N_1-1} \hat{x}_{n_1N_2+n_2} +$$

$$\sum_{n_2=0}^{N_2-1} r_{n_2} \sum_{n_1=0}^{N_1-1} x_{noise,n_1N_2+n_2} e^{-j\left(\frac{2\pi}{N_1N_2}kn\right)}$$

$$= \sum_{n_2=0}^{N_2-1} r_{n_2} \sum_{n_1=0}^{N_1-1} \hat{x}_{n_1N_2+n_2} +$$

$$\sum_{n_2=0}^{N_2-1} \sum_{n_1=0}^{N_1-1} x'_{noise,n_1N_2+n_2}$$

$$= \sum_{n_2=0}^{N_1-1} N_1 r_{n_2} \hat{x}_{n_2} + \sum_{n_2=0}^{N_2-1} \sum_{n_1=0}^{N_1-1} x'_{noise,n_1N_2+n_2}$$

where the periodicity of the signal $\hat{x}_{n_1N_2+n_2}=\hat{x}_{n_2}$ is taken into account. If the replica code and incoming signal are aligned, i.e., $r_{n_2}=\hat{x}_{n_2}/A=\pm 1$, then $$z = N_1N_2A + \sum_{n_2=0}^{N_2-1}\sum_{n_1=0}^{N_1-1} x'_{noise,n_1N_2+n_2}$$

It can be seen from the equation above that system gain is increased because of performing the addition of signals coherently, while the noise bandwidth is decreasing by the factor $N_1N_2$. The signal-to-noise ratio is also increasing by the same factor.

An efficient method for calculating the sum $$z = \sum_{n_2=0}^{N_2-1} r_{n_2} \sum_{n_1=0}^{N_1-1} x_{n_1N_2+n_2} e^{-j\left(\frac{2\pi}{N_1N_2}kn\right)}$$

in the equation (3) is described in the following. First, the inner sum is to be considered. From the splitting of k it can be seen that $k_1$ can be interpreted as the fine Doppler frequency shift while the $k_2$ is the coarse Doppler frequency component.

For each value of $n_2$ and the frequency parameter $k_1$ the coherent addition along $n_1$ will be $$y_{n_2,k_1} = \sum_{n_1=0}^{N_1-1} x_{n_1N_2+n_2} e^{-j\frac{2\pi}{N_2}k_2n_2} e^{-j\frac{2\pi}{N_1N_2}k_1(n_1N_2+n_2)} \quad (4)$$

$$= e^{-j\frac{2\pi}{N_1N_2}k_1n_2} \cdot \sum_{n_1=0}^{N_1-1} \tilde{x}_{n_1N_2+n_2} e^{-j\frac{2\pi}{N_1}k_1n_1}$$

where $$\tilde{x}_n = x_n e^{-j\frac{2\pi}{N_2}k_2n}.$$

In the above equation $y_{n_2,k_1}$ for different values of $k_1$ could be computed first by performing a time-to-frequency transform, for example discrete Fourier transform or fast Fourier transform, on rows of the matrix $\tilde{X}_{n_2,n_1}=\tilde{x}_{n_1N_2+n_2}$ and then weighting the resulting matrix in a proper manner. Thus $$Y = \tilde{X} \cdot F^T \quad (5)$$

where F is the time-to-frequency matrix and $$y_{n_2,k_1} = e^{-j\frac{2\pi}{N_1N_2}k_1n_2} \cdot Y_{n_2,k_1} \quad (6)$$

As can be seen from the equation (6) above, after the time-to-frequency transform of the rows, the elements of the matrix Y should be point-by-point multiplied with an appropriate complex sinusoid value.

The formula $$\tilde{x}_n = x_n e^{-j\frac{2\pi}{N_2}k_2n}$$

means that the incoming signal $x_n$ would be multiplied with a sinusoid defined by coarse frequency variable $k_2$ prior to the time-to-frequency transform. This could be done before fine Doppler compensation as it is shown in FIG. 1a, FIG. 1b and FIG. 2b but it could also be performed in a way presented in FIGS. 1c and 1d without using of numerically controlled oscillator 4 for acquisition process.

For the later case it is recalled that the meaning of the cross-correlation is to find the match in code phase between the received data and the replica code. Instead of compensating the coarse Doppler shift on the signal the replica code can be modulated by the same Doppler frequency:

$$\tilde{r}_n = r_n e^{j\frac{2\pi}{N_2}k_2 n}.$$

From the properties of the discrete Fourier transform the given modulation in time domain exhibits itself as a circular shift in frequency domain. Thus the frequency domain representation of the replica code can be shifted in a circular way without actual transformation for each coarse Doppler phase. The replica shifting approach is considered in detail later in this description.

Replacing n with $n_1 N_2 + n_2$, $\tilde{x}_n$ can be represented as $$\tilde{x}_n = x_n e^{-j\frac{2\pi}{N_2}k_2 n} = x_{n_1 N_2 + n_2} e^{-j\frac{2\pi}{N_2}k_2(n_1 N_2 + n_2)} = x_{n_1 N_2 + n_2} e^{-j\frac{2\pi}{N_2}k_2 n_2} \quad (7)$$

The equation (7) shows that the coarse acquisition modulation is independent on both the fine frequency $k_1$ and particular epoch $n_1$. This means that the same modulation applies to all the epochs and it can be taken out of the time-to-frequency transform of the rows of the matrix X. In the following matrixes are used to further explain the cross-correlation.

Next, the outer sum in the equation (3) is to be considered. In fact, this means actually that the replica code is correlated with the coherently enhanced incoming signal. This sum should be performed for all possible circular replica code shifts because the code phase of the incoming signal is unknown. Although other methods of prior art could be used the preferred embodiment is an efficient approach to perform the cross-correlation for all possible shifts of replica code based on discrete Fourier transform (DFT) and its fast implementation (FFT).

The cross-correlation method using DFT assumes that DFT of received signal fragment is point-by-point multiplied by the DFT of the time-reversed replica code and the inverse DFT shows the result of the cross-correlation. The following matrix formulation of this process can be used with a situation in which no Doppler compensation is performed:

$$Z = F^{-1} \cdot R \cdot F \cdot X \quad (8)$$

where Z is the cross-correlation matrix, in which each column I is the result of cross-correlation of the I-th column of X with the replica code, square matrix R is diagonal and $\text{diag}(R) = F \cdot \bar{r}_{tr}$, where $\bar{r}_{tr}$ is the replica code vector. To include also the Doppler compensation the above equation (8) can be modified by point-by-point multiplication of two matrices C and $\tilde{X} \cdot F^T$. This point-by-point multiplication of two matrices is denoted as (.*) in this description. Then the cross-correlation can be written as $$Z = F^{-1} \cdot R \cdot F \cdot C(.*)(\tilde{X} \cdot F^T) \quad (9)$$

where matrix C is defined as $$C_{n_2, k_1} = e^{-j\frac{2\pi}{N_1 N_2}k_1 n_2},$$

$n_2 = 0, 1, \ldots, N_2 - 1$. The specified range of $k_1$ is due to the fact that the range of frequencies less than 1 kHz are to be considered at this stage.

When the coarse Doppler frequency component described by the variable $k_2$ is taken into account, the equation (9) can be modified into a form $$Z = F^{-1} \cdot R \cdot F \cdot C(.*)(M_1 \cdot X \cdot F^T) = F^{-1} \cdot R \cdot F \cdot M_1 \cdot C(.*)(X \cdot F^T) \quad (10)$$

where $M_1$ is a diagonal matrix and $$(\text{diag}(M_1))_{n_2} = e^{-j\frac{2\pi}{N_2}k_2 n_2}.$$

So each column is modulated and then time-to-frequency transform such as FFT is performed. Taking into account that $N_2$ is the epoch length and the properties of the DFT, modulation on the input by $$e^{-j\frac{2\pi}{N_2}k_2 n_2}$$

circularly shifts the output of the time-to-frequency transform by $k_2$, i.e. by an integer shift. If also the transform domain representation of the time-reversed replica code is circularly shifted, the result is a shifted vector prior to frequency-to-time transform, such as inverse FFT. Shifting in the transform domain can be considered as modulation in time domain. Therefore the coarse modulation on the input of the correlator exhibits itself as a modulation on its output if the transform domain representation of the time-reversed replica code is circularly shifted by $k_2$. More formally, the cross-correlation can be written as $$Z = M_1 \cdot F^{-1} \cdot R_{shift} \cdot F \cdot C(.*)(X \cdot F^T) \quad (11)$$

where $R_{shift}$ is the diagonal matrix with diagonal elements representing transform domain replica code shifted circularly by $k_2$ positions. The complex exponentials in $M_1$ are constant for each row and normally they are not significant for non-coherent processing and detection. If necessary, they can be compensated by appropriate multiplication. As a conclusion from the mathematical inspection above is that the modulation in the input (right of F in equation 9) is moved to the output (left of F in the equation 11). Therefore the first two time-to-frequency transforms in equation (11) are not necessary for each coarse frequency search. FIG. 1d shows the structure of the acquisition block with the method of shifting the replica code. The numerically controlled oscillator 4 is not required for acquisition in this advantageous embodiment of the invention but it is used for tracking purposes. Another remarkable advantage of using the method of shifting the replica code is the possibility of significantly reducing the computation complexity at the expense of memory. In the method according to an advantageous embodiment of the invention the input signal is time-to-frequency transformed twice, in-epoch compensated, and stored into memory. This part is performed by the section 11 in FIG. 1d. Then the result can be used for all coarse frequency stages and with all the replica codes. This will be performed by block 16 in FIG. 1d. The complexity then is reduced almost two times and is mainly due to inverse DFT (FFT).

FIG. 10 illustrates an example of the two-dimensional search matrix S formed by the shifting of the FFT transformed pseudo random replica sequence of the corresponding satellite according to an advantageous embodiment of the invention.

The operation of the acquisition block of the positioning receiver has only been presented above, but practical receivers also comprise e.g. positioning functions which can comply with prior art as such.

To calculate the position, the receiver performs the reception of a signal preferably on the basis of the signal received from at least four satellites. Thus, the above presented steps are repeated for the signal of each satellite, if necessary.

A majority of the blocks required for applying the method can be implemented e.g. in a digital signal processor (not shown). To perform the FFT transforms, it is possible to use either hardware-based solutions or software applications in the digital signal processor. Furthermore, to control the operation of the receiver, it is possible to use a control means, preferably a microprocessor or the like, which is, however, not presented in the appended drawings, and which is prior art known to anyone skilled in the art.

At least some of the blocks required for applying the method can also be implemented in a communication network (not shown), wherefore such blocks are not necessarily needed in the receiver. In this kind of arrangement the receiver and the network are arranged to communicate with each other so that the steps according to the invention can be performed.

The circular shifting of the replica code is also applicable in other FFT based correlation systems, where a phase shift of a received, code-phase modulated signal is to be determined, e.g. CDMA systems (code division-multiple access).

Further, the appended FIG. 11 shows an electronic device 23 complying with an advantageous embodiment of the invention, comprising functions of a wireless communication device and a positioning receiver. A first antenna 24 is used to receive a signal transmitted from positioning satellites. The received signal is transferred to a first radio part 25, in which the signal is converted to an intermediate frequency and digitized. The first radio part comprises e.g. a downconverter block 2, and an A/D-converter block 3 and a multiplier block 36 in the receiver 1 of FIG. 1a or FIG. 1c. The digitized signal, which at this stage preferably comprises I and Q components, is transferred to a digital signal processing unit 26, in which e.g. the above-presented correlations to the different phases of the replica code signal r are performed. The electronic device 23 also comprises first memory means 27 which comprise e.g. a random access memory for storing data required during the operation of the receiver, as well as preferably also a read only memory and/or an non-volatile random access memory for storing the program code of the digital signal processing unit 26. In this embodiment, for example part of the functions of the control block 7, such as the FFT transform blocks 12, 15, the multipliers 14, 17, 20 and the inverse FFT block 21, are implemented in the signal processing unit 26. The digital signal processing unit 26 comprises preferably also means for generating and shifting the frequency domain replica code. It is obvious that at least some of said functional blocks can also be implemented in another way known per se. For example, the FFT transform blocks 12, 15 and the inverse FFT transform block 21 can also be implemented with integrated circuits, or the like, designed for these purposes.

The digital signal processing unit 26 transfers the values for determining the code phase and the frequency deviation to be used in the determining block 22 to a processor block 28 which comprises e.g. a microprocessor and I/O logics. Some of the functions of the acquisition block 6 are preferably at least partly implemented as program commands in the processor block. As the data memory and the program memory for the processor block 28, second memory means 29 are used. It is obvious that the first memory means 27 and the second memory means 29 can also comprise a common memory. Positioning information can be displayed to the user on a display 30.

Also functions of the wireless communication device are implemented in the application software of the processor block 28. Thus, the display 30 can also be used, in a way known per se, to display e.g. call information. Using a keypad 31, the user can control the positioning receiver as well as the wireless communication device. A codec 32 is used to encode and decode audio signals. Further, FIG. 11 shows a radio part 33 and a second antenna 34 for the wireless communication device.

The present invention is not limited solely to the above presented embodiments, but it can be modified within the scope of the appended claims.

What is claimed is:

1. A method for acquiring a receiver into a code modulated spread spectrum signal received by the receiver, in which method at least one replica code is used which corresponds to a code used with the modulation having a pre-determined number of chips, and an examination phase is performed, in which a frequency shift of the signal within a selected frequency area is examined, and a code phase of the code used with the modulation is examined, wherein the frequency shift examination is divided into a first estimation phase and a second estimation phase, wherein in the first estimation phase the selected frequency area is divided into a first set of frequencies, and in the second estimation phase a second set of frequencies is examined nearby each frequency of the first set of frequencies, that a comparison for frequencies of the second set of frequencies is performed using the received signal and the replica code, and that the results of the comparison are used to estimate a correct frequency shift.

2. The method according to the claim 1, in which a reference oscillator signal is formed, wherein in each of the first estimation phases the received signal is mixed with said reference oscillator signal, that a frequency of the reference oscillator is set into a different frequency for different first estimation phases, and that the mixed signal is used in the second estimation phase.

3. The method according to the claim 1, wherein a time-to-frequency transformation of a reversal of the replica code is produced, that in each of the first estimation phase a transformed, reversed replica code is shifted such that in different first estimation phases a different phase shift of the transformed, reversed replica code is used.

4. The method according to claim 1, wherein the received signal is sampled for producing a set of samples, a matrix is formed from the samples, the matrix having a first dimension and a second dimension, and the second estimation phase having the steps of performing a first time-to-frequency transform on the matrix in said second dimension, and performing a second time-to-frequency transform on the time-to-frequency transformed matrix in said first dimension.

5. The method according to claim 4, wherein a time-to-frequency transform is performed on a reversed replica code, the time-to-frequency transformed replica code is multiplied with a resulting matrix of the second time-to-frequency transformation, a frequency-to-time transform is performed on a resulting matrix of the multiplication.

6. The method according to claim 5, wherein a non-coherent processing is performed on at least one frequency-to-time transformed matrix, in which non-coherent processing a maximum value is searched for finding a correct frequency shift and code phase.

7. The method according to claim 4, wherein said first dimension equals the number of samples of the code period.

8. The method according to claim 1, wherein the received signal is sampled for producing a set of samples, a matrix is formed from the samples, the matrix having a first dimension and a second dimension, a compensation matrix is formed, and the second estimation phase having the steps of performing a first time-to-frequency transform on the matrix in said second dimension, multiplying the time-to-frequency transformed matrix with the compensation matrix to form a compensated matrix, and performing a second time-to-frequency transform on the compensated matrix in said first dimension.

9. The method according to claim 8, wherein said first dimension equals the number of chips of the code.

10. A location system comprising at least:
a receiver having means for receiving code modulated spread spectrum signal,
means for acquiring the receiver into the received signal,
means for using at least one replica code which corresponds to a code used with the modulation, which code having a pre-determined number of chips, and
examination means for examining a frequency shift of the signal within a selected frequency area, and a code phase of the code used with the modulation,
wherein the examination of the frequency shift is divided into a first estimation phase and a second estimation phase, wherein the location system further comprises:
means for dividing the selected frequency area into a first set of frequencies for the first estimation phase,
means for examining a second set of frequencies nearby each frequency of the first set of frequencies in the second estimation phase, and
means for performing a comparison for frequencies of the second set of frequencies by using the received signal and the replica code,
and the examination means comprise means for evaluating a the correct frequency shift by using the results of the comparison.

11. The location system according to the claim 10, further comprising a reference oscillator for producing a reference oscillator signal, wherein the location system further comprises:
means for mixing the received signal with said reference oscillator signal in the first estimation phases, and
means for adjusting a frequency of the reference oscillator into a different frequency for different first estimation phases,
and that the mixed signal is arranged to be used in the second estimation phase.

12. The location system according to the claim 10, wherein it comprises means for producing a time-to-frequency transformation of a reversal of the replica, and for shifting the transformed, reversed replica code in each of the first estimation phase such that in different first estimation phases a different phase shift of the transformed, reversed replica code is arranged to be used.

13. The location system according to claim 10, wherein it comprises:
means for sampling the received signal for producing a set of samples,
means for forming a matrix from the samples, the matrix having a first dimension and a second dimension,
means for performing a first time-to-frequency transform on the matrix in said second dimension, and
means for performing a second time-to-frequency transform on the time-to-frequency transformed matrix in said first dimension.

14. The location system according to claim 13, wherein it comprises:
means for forming a time-to-frequency transformed reversed replica code,
means for multiplying the time-to-frequency transformed reversed replica code with the resulting matrix of the second time-to-frequency transformation, and
means for performing a frequency-to-time transform on the resulting matrix of the multiplication.

15. The location system according to the claim 14, wherein it comprises means for performing a non-coherent processing on the frequency-to-time transformed matrix, in which non-coherent processing a maximum value is arranged to be searched for finding a correct frequency shift and code phase.

16. The location system according to claim 13, wherein said first dimension equals the number of samples of the code period.

17. The location system according to claim 10, wherein it comprises:
means for sampling the received signal for producing a set of samples,
means for forming a matrix from the samples, the matrix having a first dimension and a second dimension,
means for forming a compensation matrix,
means for multiplying the time-to-frequency transformed matrix with the compensation matrix to form a compensated matrix, and
means for performing a second time-to-frequency transform on the compensated matrix in said first dimension.

18. The location system according to claim 17, wherein said first dimension equals the number of samples of the code period.

19. A receiver comprising at least:
means for receiving code modulated spread spectrum signal,
means for acquiring the receiver into the received signal,
means for using at least one replica code which corresponds to a code used with the modulation, which code having a pre-determined number of chips, and
examination means for examining a frequency shift of the signal within a selected frequency area, and a code phase of the code used with the modulation,
wherein the examination of the frequency shift is divided into a first estimation phase and a second estimation phase, wherein the receiver further comprises:
means for dividing the selected frequency area into a first set of frequencies for the first estimation phase,
means for examining a second set of frequencies nearby each frequency of the first set of frequencies in the second estimation phase, and
means for performing a comparison for frequencies of the second set of frequencies by using the received signal and the replica code,
and the examination means comprise means for evaluating a correct frequency shift by using the results of the comparison.

20. The receiver according to the claim 19, further comprising a reference oscillator for producing a reference oscillator signal, wherein the receiver further comprises:
means for mixing the received signal with said reference oscillator signal in the first estimation phases, and
means for adjusting the frequency of the reference oscillator into a different frequency for different first estimation phases, and that the mixed signal is arranged to be used in the second estimation phase.

21. The receiver according to the claim 19, wherein it comprises means for producing a time-to-frequency transformation of a reversal of the replica code, and for shifting the transformed, reversed replica code in each of the first estimation phase such that in different first estimation phases a different phase shift of the transformed, reversed replica code is arranged to be used.

22. The receiver according to claim 19, wherein it comprises:
   means for sampling the received signal for producing a set of samples
   means for forming a matrix from the samples, the matrix having a first dimension and a second dimension,
   means for performing a first time-to-frequency transform on the matrix in said second dimension, and
   means for performing a second time-to-frequency transform on the time-to-frequency transformed matrix in said first dimension.

23. The receiver according to claim 22, wherein said first dimension equals the number of samples of the code period.

24. The receiver according to claim 19, wherein it comprises:
   means for sampling the received signal for producing a set of samples,
   means for forming a matrix from the samples, the matrix having a first dimension and a second dimension,
   means for forming a compensation matrix,
   means for multiplying the time-to-frequency transformed matrix with the compensation matrix to form a compensated matrix, and
   means for performing a second time-to-frequency transform on the compensated matrix in said first dimension.

25. The receiver according to claim 24, wherein said first dimension equals the number of samples of the code period.

26. The receiver according to claim 22, wherein it comprises:
   means for forming a time-to-frequency transformed reversed replica code,
   means for multiplying the time-to-frequency transformed reversed replica code with a resulting matrix of the second time-to-frequency transformation, and
   means for performing a frequency-to-time transform on a resulting matrix of the multiplication.

27. The receiver according to the claim 26, wherein it comprises means for performing a non-coherent processing on the frequency-to-time transformed matrix, in which non-coherent processing a maximum value is arranged to be searched for finding a correct frequency shift and code phase.

28. An electronic device comprising at least:
   a receiver having means for receiving code modulated spread spectrum signal,
   means for acquiring the receiver into the received signal,
   means for using at least one replica code which corresponds to a code used with the modulation, which code having a pre-determined number of chips, and
   examination means for examining a frequency shift of the signal within a selected frequency area, and a code phase of the code used with the modulation,
   wherein the examination of the frequency shift is divided into a first estimation phase and a second estimation phase, wherein the electronic device further comprises:
   means for dividing the selected frequency area into a first set of frequencies for the first estimation phase,
   means for examining a second set of frequencies nearby each frequency of the first set of frequencies in the second estimation phase, and
   means for performing a comparison for frequencies of the second set of frequencies by using the received signal and the replica code,
   and the examination means comprise means for evaluating a correct frequency shift by using the results of the comparison.

29. The electronic device according to the claim 28, wherein it further comprises means for communicating with a mobile communication network.

* * * * *